United States Patent
Mishra et al.

(10) Patent No.: US 9,965,410 B2
(45) Date of Patent: May 8, 2018

(54) PRIORITY-BASED DATA COMMUNICATION OVER MULTIPLE COMMUNICATION BUSES

(71) Applicant: QUALCOMM Incorporated, San Diego, CA (US)

(72) Inventors: Lalan Jee Mishra, San Diego, CA (US); Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 195 days.

(21) Appl. No.: 15/002,558

(22) Filed: Jan. 21, 2016

(65) Prior Publication Data

US 2017/0212850 A1    Jul. 27, 2017

(51) Int. Cl.
| | | |
|---|---|---|
| *G06F 13/00* | (2006.01) | |
| *G06F 13/18* | (2006.01) | |
| *H04L 12/40* | (2006.01) | |
| *G06F 13/364* | (2006.01) | |
| *G06F 13/42* | (2006.01) | |

(Continued)

(52) U.S. Cl.
CPC ............ *G06F 13/18* (2013.01); *G06F 13/364* (2013.01); *G06F 13/385* (2013.01); *G06F 13/4282* (2013.01); *H04L 12/403* (2013.01); *H04L 12/40143* (2013.01); *H04L 12/40182* (2013.01); *G06F 12/1425* (2013.01)

(58) Field of Classification Search
CPC .... G06F 13/18; G06F 13/385; G06F 12/1425; G06F 13/4282; G06F 13/364; H04L 12/403; H04L 12/40182; H04L 12/40143; G01S 19/35

See application file for complete search history.

(56) References Cited

U.S. PATENT DOCUMENTS

| | | |
|---|---|---|
| 5,708,794 A | 1/1998 | Parks et al. |
| 6,715,049 B1 | 3/2004 | Hayakashi |
| 6,823,411 B2 | 11/2004 | Hofmann et al. |
| 7,032,082 B1 * | 4/2006 | Rahim .................... G06F 12/02 711/154 |
| 7,305,510 B2 | 12/2007 | Miller |
| 2010/0122000 A1 | 5/2010 | Jeanne et al. |
| 2012/0166699 A1 | 6/2012 | Kumar et al. |

(Continued)

OTHER PUBLICATIONS

International Search Report and Written Opinion for PCT/US2016/066870, dated Mar. 3, 2017, 12 pages.

*Primary Examiner* — Jing-Yih Shyu
(74) *Attorney, Agent, or Firm* — Withrow & Terranova, PLLC

(57) ABSTRACT

Priority-based data communication over multiple communication buses is disclosed. In this regard, an electronic device is communicatively coupled to a first communication bus and a second communication bus. The electronic device is configured to detect communication signals communicated over the first communication bus and the second communication bus. If the communication signals are detected on both the first communication bus and the second communication bus, the electronic device is further configured to protect data received over the second communication bus from being overwritten by data received over the first communication bus. By configuring the electronic device to support multiple communication buses, it is possible to configure one of the multiple communication buses as a priority communication bus, thus allowing time-critical communications to be carried out over the priority communication bus in a timely manner without preempting ongoing communications on other communication buses.

30 Claims, 8 Drawing Sheets

(51) Int. Cl.
  *G06F 13/38* (2006.01)
  *H04L 12/403* (2006.01)
  *G06F 12/14* (2006.01)

(56) References Cited

U.S. PATENT DOCUMENTS

| | | |
|---|---|---|
| 2012/0290763 A1 | 11/2012 | Li |
| 2013/0198427 A1 | 8/2013 | Leitner et al. |
| 2013/0242800 A1 | 9/2013 | Gruber et al. |
| 2015/0378950 A1* | 12/2015 | Cox .................. G06F 13/385 710/14 |
| 2016/0119169 A1* | 4/2016 | Schober ............. H04L 27/0014 370/503 |
| 2016/0216905 A1* | 7/2016 | Yazdani ................ G06F 3/0619 |

* cited by examiner

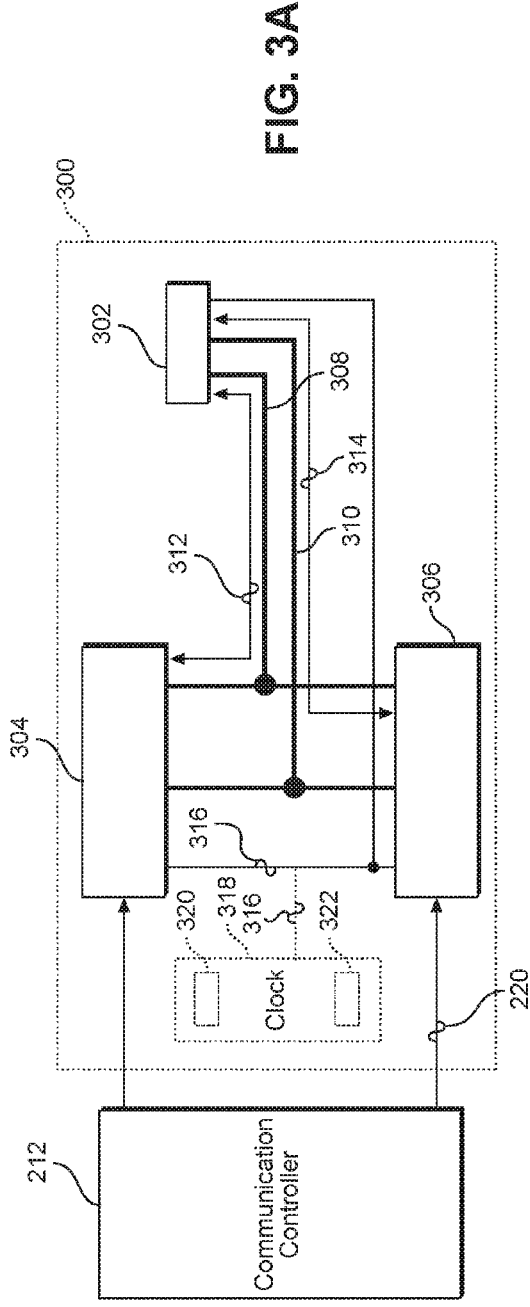
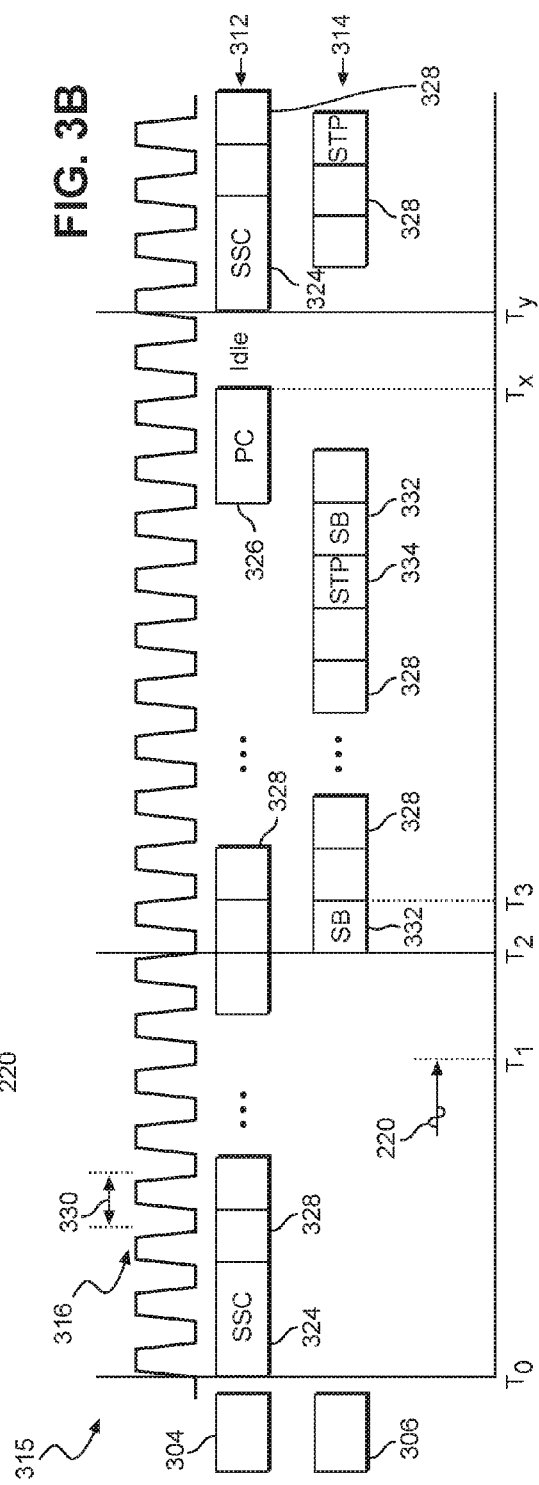
FIG. 3A
FIG. 3B

PRIORITY-BASED DATA COMMUNICATION OVER MULTIPLE COMMUNICATION BUSES

BACKGROUND

I. Field of the Disclosure

The technology of the disclosure relates generally to a signaling protocol for use on a communication bus, and particularly for a radio frequency front-end control interface (RFFE) bus.

II. Background

Computing devices have become increasingly common in modern society. Mobile phones are among the more common computing devices. While such devices may initially have started out as simple devices that allowed audio communication through the Public Land Mobile Network (PLMN) to the Public Standard Telephone Network (PSTN), they have evolved into smart phones capable of supporting full multimedia experiences as well as supporting multiple wireless protocols. Even within the cellular wireless protocols, mobile phone radios have developed into highly complex, multi-band, and multi-standard designs that often have multiple radio frequency (RF) signal chains. Every component in the RF signal chain has to be in the desired configuration at any given time, or the system will fail. Therefore, accurate timing, triggers, and speed are all necessary.

As further explained on the MIPI Alliance® website, "[t]he MIPI Alliance Specification for RF Front-End Control Interface (RFFE) was developed to offer a common and widespread method for controlling RF front-end devices. There are a variety of front-end devices, including Power Amplifiers (PA), Low-Noise Amplifiers (LNA), filters, switches, power management modules, antenna tuners and sensors. These functions may be located either in separate devices or integrated into a single device, depending on the application. The trend in mobile radio communications is towards complex multi-radio systems comprised of several parallel transceivers. This implies a leap in complexity of the RF front-end design. Thus, the RFFE bus must be able to operate efficiently in configurations from the simplest one Master and one Slave configuration to, potentially, multi-Master configurations with tens of Slaves."

In devices where there are multiple masters on an RFFE bus, the RFFE protocol allows ownership transfer that introduces unavoidable latency. Aggravating the latency issue is that the latency may not be a fixed latency because of collision unpredictability. Such unpredictable latency may interfere with the performance requirements set forth by the various wireless protocols being served by the RF front-end. Accordingly, there is a need for a reduced latency hand-off approach.

SUMMARY OF THE DISCLOSURE

Aspects disclosed in the detailed description include priority-based data communication over multiple communication buses. In this regard, an electronic device, which may be a slave device in a radio frequency front-end control interface (RFFE) system for example, is communicatively coupled to a first communication bus and a second communication bus. The electronic device is configured to detect communication signals communicated over the first communication bus and the second communication bus. If the communication signals are detected on both the first communication bus and the second communication bus, the electronic device is further configured to protect data received over the second communication bus from being overwritten by data received over the first communication bus. By configuring the electronic device to support multiple communication buses, it is possible to configure one of the multiple communication buses as a priority communication bus. As such, it is possible to carry out time-critical communications over the priority communication bus in a timely manner (e.g., under one microsecond (1 µs) latency budget) without preempting ongoing communications on other communication buses, thus ensuring uninterrupted data communication for an enhanced user experience.

In this regard, in one aspect, an electronic device is provided. The electronic device includes a plurality of data storage blocks. The electronic device also includes input/output (I/O) circuitry communicatively coupled to a first communication bus and a second communication bus. The electronic device also includes a control circuit. The control circuit is configured to detect whether the I/O circuitry receives a first communication signal over the first communication bus. If the first communication signal is detected, the control circuit is configured to configure the I/O circuitry to write data received in the first communication signal to one or more first data storage blocks among the plurality of data storage blocks. The control circuit is also configured to detect whether the I/O circuitry receives a second communication signal over the second communication bus. If the second communication signal is detected, the control circuit is configured to configure the I/O circuitry to write data received in the second communication signal to one or more second data storage blocks among the plurality of data storage blocks. If the second communication signal is detected, the control circuit is also configured to protect the one or more second data storage blocks from being overwritten by the data received in the first communication signal if the first communication signal is detected.

In another aspect, a method for controlling communications over a first communication bus and a second communication bus is provided. The method includes detecting whether a first communication signal is received over a first communication bus. If the first communication signal is detected, the method also includes writing data received in the first communication signal to one or more first data storage blocks among a plurality of data storage blocks. The method also includes detecting whether a second communication signal is received over a second communication bus. If the second communication signal is detected, the method also includes writing data received in the second communication signal to one or more second data storage blocks among the plurality of data storage blocks. If the second communication signal is detected, the method also includes protecting the one or more second data storage blocks from being overwritten by the data received in the first communication signal if the first communication signal is detected.

In another aspect, a communication system is provided. The communication system includes at least one first master device configured to communicate a first communication signal with at least one slave device over a first communication bus. The communication system also includes at least one second master device. The at least one second master device is configured to detect whether the at least one first master device communicates the first communication signal over the first communication bus. The at least one second master device is also configured to communicate a second communication signal with the at least one slave device over a second communication bus if the at least one first master device is detected to communicate the first communication signal over the first communication bus. The at least one slave device includes a plurality of data storage blocks. The at least one slave device also includes I/O circuitry communicatively coupled to the first communication bus and the second communication bus. The at least one slave device also includes a control circuit. The control circuit is configured to detect whether the I/O circuitry receives the first communication signal over the first communication bus. If the first communication signal is detected, the control circuit is also configured to configure the I/O circuitry to write data received in the first communication signal to one or more first data storage blocks among the plurality of data storage blocks. The control circuit is also configured to detect whether the I/O circuitry receives the second communication signal over the second communication bus. If the second communication signal is detected, the control circuit is also configured to configure the I/O circuitry to write data received in the second communication signal to one or more second data storage blocks among the plurality of data storage blocks. If the second communication signal is detected, the control circuit is also configured to protect the one or more second data storage blocks from being overwritten by the data received in the first communication signal if the first communication signal is detected.

In another aspect, a communication system is provided. The communication system includes at least one first master device configured to communicate a first communication signal with at least one first slave device over a first communication bus. The communication system also includes at least one second master device configured to communicate a second communication signal with at least one second slave device over a second communication bus. The at least one second slave device includes a plurality of data storage blocks. The at least one second slave device also includes I/O circuitry communicatively coupled to the first communication bus and the second communication bus. The at least one second slave device also includes a control circuit. The control circuit is configured to detect whether the I/O circuitry receives the second communication signal over the second communication bus. If the second communication signal is detected, the control circuit is also configured to configure the I/O circuitry to write data received in the second communication signal to one or more second data storage blocks among the plurality of data storage blocks. If the second communication signal is detected, the control circuit is also configured to protect the one or more second data storage blocks from being overwritten by data received in the first communication signal if the first communication signal is also detected on the second communication bus.

BRIEF DESCRIPTION OF THE FIGURES

FIG. 3A is a schematic diagram of an exemplary RFFE system in which at least one slave device is configured to be switched gracefully from communicating with at least one first master device to communicating with at least one second master device without suffering the bus switching delay illustrated in FIG. 2B;

FIG. 3B is a signal flow diagram providing an exemplary illustration of the at least one first master device and the at least one second master device of FIG. 3A configured to communicate based on the RFFE protocol;

DETAILED DESCRIPTION

Figure 1:
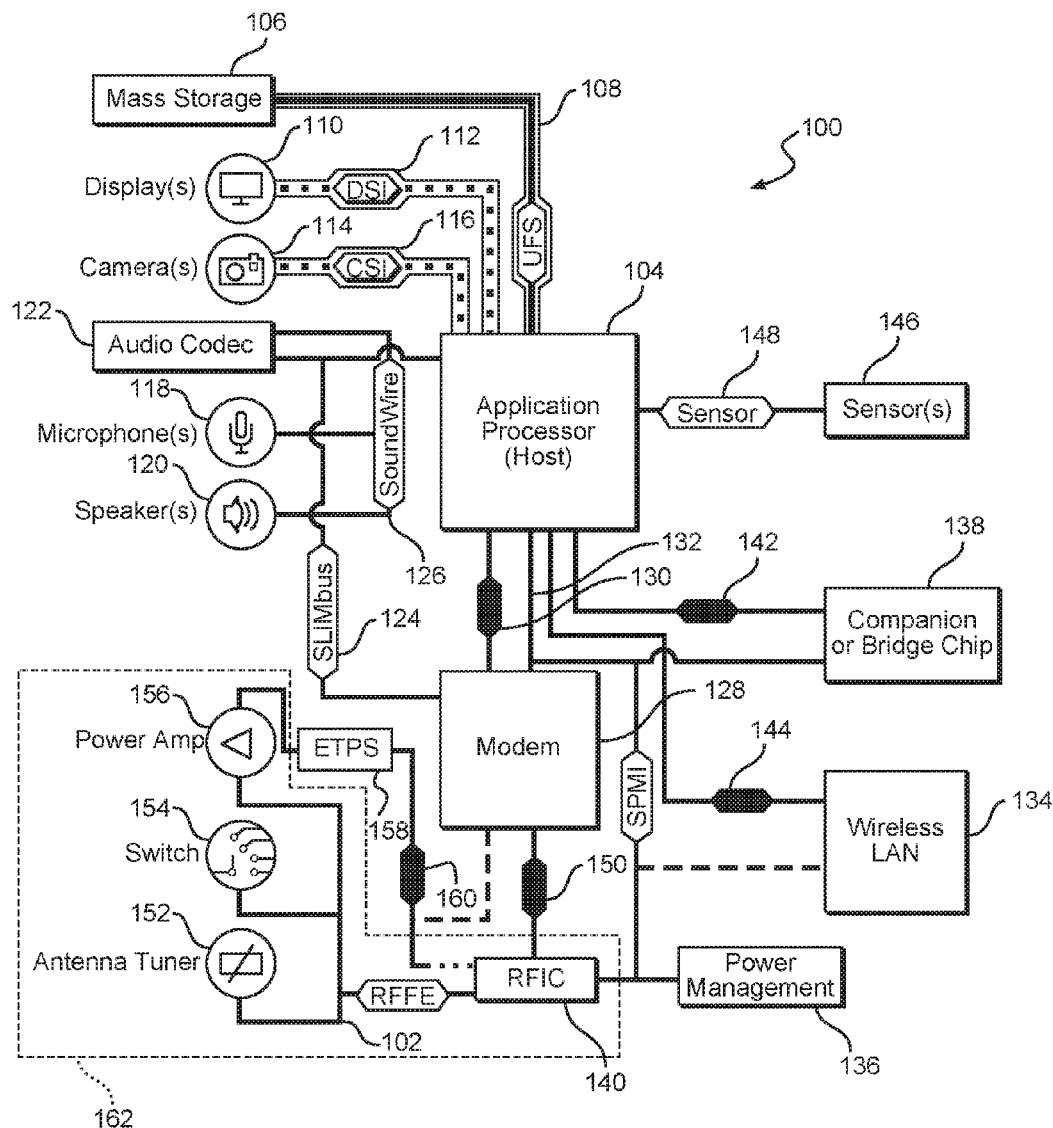
FIG. 1 is system level block diagram of an exemplary mobile terminal configured to communicate based on MIPI Alliance® (MIPI) defined architecture.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include priority-based data communication over multiple communication buses. In this regard, an electronic device, which may be a slave device in a radio frequency front-end control interface (RFFE) system for example, is communicatively coupled to a first communication bus and a second communication bus. The electronic device is configured to detect communication signals communicated over the first communication bus and the second communication bus. If the communication signals are detected on both the first communication bus and the second communication bus, the electronic device is further configured to protect data received over the second communication bus from being overwritten by data received over the first communication bus. By configuring the electronic device to support multiple communication buses, it is possible to configure one of the multiple communication buses as a priority communication bus. As such, it is possible to carry out time-critical communications over the priority communication bus in a timely manner (e.g., under one microsecond (1 µs) latency budget) without preempting ongoing communications on other communication buses, thus ensuring uninterrupted data communication for an enhanced user experience.

Before discussing exemplary aspects of priority-based data communication over multiple communication buses that include specific aspects of the present disclosure, a brief overview of a mobile terminal configured based on MIPI Alliance® (MIPI) defined architecture is first provided in FIG. 1. A brief overview of a conventional RFFE system, which may be provided in the conventional mobile terminal of FIG. 1, configured to operate according to the RFFE protocol is then discussed with reference to FIGS. 2A and 2B. The discussion of specific exemplary aspects of priority-based data communication over multiple communication buses starts with reference to FIG. 3A.

In this regard, FIG. 1 is system-level block diagram of an exemplary mobile terminal 100 such as a smart phone, mobile computing device tablet, or the like. While a mobile terminal is particularly contemplated as being capable of benefiting from exemplary aspects of the present disclosure, it should be appreciated that the present disclosure is not so limited and may be useful in any system having a bus that has multiple masters and needing priority-based bus access with minimal latency. For the sake of illustration, it is assumed that an RFFE bus 102 within the mobile terminal 100 is among multiple communication buses configured to support priority-based data communication according to the present disclosure.

With continued reference to FIG. 1, the mobile terminal 100 includes an application processor 104 (sometimes referred to as a host) that communicates with a mass storage element 106 through a universal flash storage (UFS) bus 108. The application processor 104 may further be connected to a display 110 through a display serial interface (DSI) bus 112 and a camera 114 through a camera serial interface (CSI) bus 116. Various audio elements such as a microphone 118, a speaker 120, and an audio codec 122 may be coupled to the application processor 104 through a serial low power interchip multimedia bus (SLIMbus) 124. Additionally, the audio elements may communicate with each other through a SOUNDWIRE™ bus 126. A modem 128 may also be coupled to the SLIMbus 124. The modem 128 may further be connected to the application processor 104 through a peripheral component interconnect (PCI) or PCI express (PCIe) bus 130 and/or a system power management interface (SPMI) bus 132.

With continued reference to FIG. 1, the SPMI bus 132 may also be coupled to a wireless local area network (WLAN) integrated circuit (IC) (WLAN IC) 134, a power management integrated circuit (PMIC) 136, a companion integrated circuit (sometimes referred to as a bridge chip) 138, and a radio frequency integrated circuit (RFIC) 140. It should be appreciated that separate PCI buses 142 and 144 may also couple the application processor 104 to the companion integrated circuit 138 and the WLAN IC 134. The application processor 104 may further be connected to sensors 146 through a sensor bus 148. The modem 128 and the RFIC 140 may communicate using a bus 150.

With continued reference to FIG. 1, and of particular interest for the present disclosure, the RFIC 140 may couple to one or more RFFE elements, such as an antenna tuner 152, a switch 154, and a power amplifier 156 through the RFFE bus 102. Additionally, the RFIC 140 may couple to an envelope tracking power supply (ETPS) 158 through a bus 160, and the ETPS 158 may communicate with the power amplifier 156. Collectively, the RFFE elements, including the RFIC 140, may be considered an RFFE, system 162.

Figure 2A:
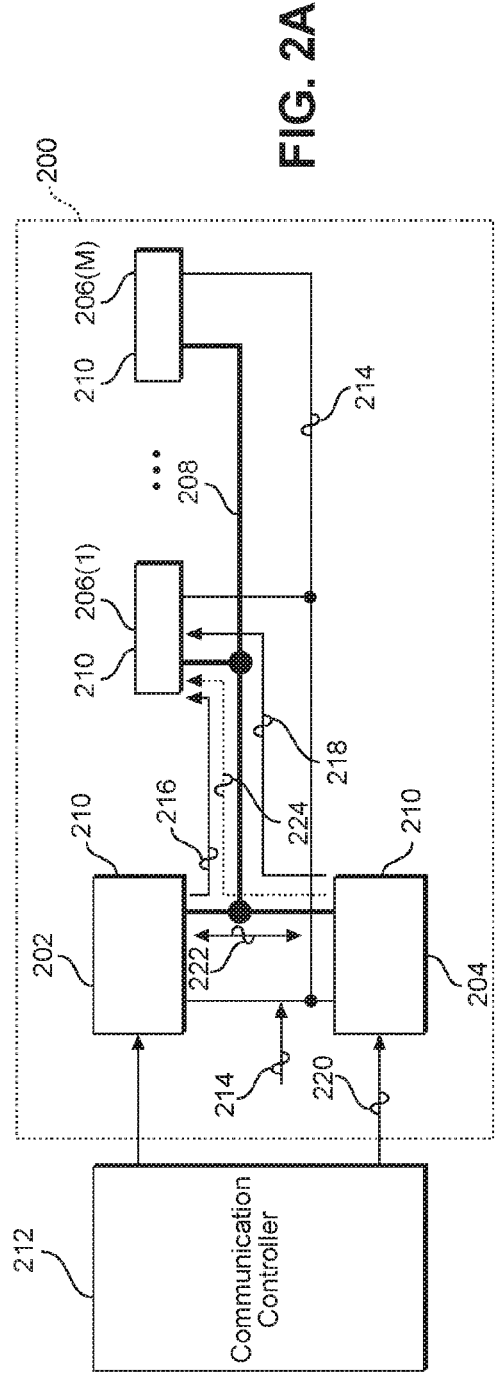
FIG. 2A is a schematic diagram of an exemplary conventional radio frequency front-end control interface (RFFE) system configured to communicate according to the RFFE protocol.

The RFFE system 162 may be configured to communicate over the RFFE bus 102 based on the RFFE protocol. In this regard, FIG. 2A is a schematic diagram of an exemplary conventional RFFE system 200 configured to communicate according to the RFFE, protocol. The conventional RFFE system 200 includes at least one first master device such as first master device 202, at least one second master device such as second master device 204, and a plurality of slave devices 206(1)-206(M) that are interconnected over an RFFE bus 208. Collectively, the first master device 202, the second master device 204, and the plurality of slave devices 206(1)-206(M) are end nodes 210 on the RFFE bus 208.

In a non-limiting example, the first master device 202 may be a wireless wide-area network (WWAN) communication IC and the second master device 204 may be a WLAN communication IC. At least one of the plurality of slave devices 206(1)-206(M), for example slave device 206(1), may be an RF front-end module (RF FEM) configured to operate in one or more specific RF spectrums. A communication controller 212, which may be the application processor 104, the modem 128, and/or the WLAN IC 134 of FIG. 1, controls WWAN and WLAN communications via the WWAN communication IC or the WLAN communication IC, respectively. In a non-limiting example, the RFFE bus 208 is synchronized to a clock signal 214.

Since the RFFE bus 208 is shared among the end nodes 210 on the RFFE bus 208, data can only be communicated between one master device among the first master device 202 and the second master device 204, and one or more of the plurality of slave devices 206(1)-206(M) at a given time. For example, the communication controller 212 may first configure the first master device 202 (e.g., the WWAN communication IC) to acquire the RFFE bus 208 for communicating a WWAN communication signal 216 via the slave device 206(1) (e.g., the RF FEM). Accordingly, the first master device 202 and the slave device 206(1) can occupy the RFFE, bus 208 to communicate the WWAN communication signal 216 until expiration of a specific temporal period $P_1$ (not shown).

While the first master device 202 is communicating to the slave device 206(1) over the RFFE bus 208, the communication controller 212 may need to configure the second master device 204 (e.g., the WLAN communication IC) to acquire the RFFE bus 208 for communicating a WLAN communication signal 218 via the slave device 206(1). In a non-limiting example, the communication controller 212 may instruct the second master device 204 via a configuration signal 220. Since the RFFE bus 208 is currently occupied by the first master device 202, the second master device 204 needs to acquire the RFFE bus 208 before communicating the WLAN communication signal 218 to the slave device 206(1). In a non-limiting example, the second master device 204 may acquire the RFFE bus 208 by initiating an RFFE handover procedure via bus handover signal 222. Upon acquiring ownership to the RFFE, bus 208, the second master device 204 may reconfigure the slave device 206(1) via a slave configuration signal 224. Subsequently, the second master device 204 may communicate the WLAN communication signal 218 via the slave device 206(1).

Figure 2B:
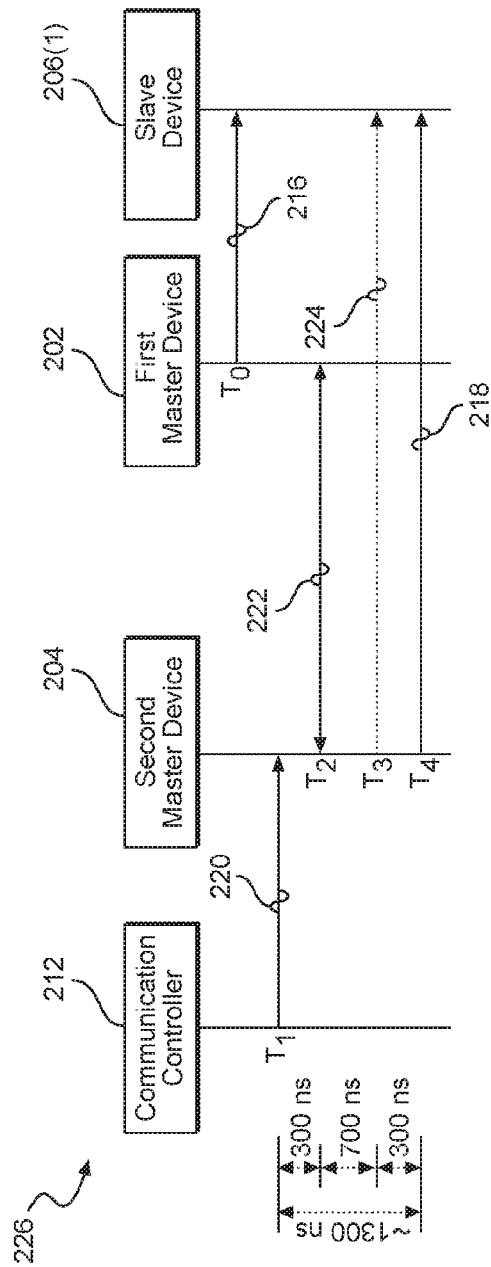
FIG. 2B is a signal flow diagram providing an exemplary illustration of a bus switching delay associated with acquiring an RFFE bus according to an RFFE handover procedure in the RFFE system of FIG. 2A.

FIG. 2B is a signal flow diagram 226 providing an exemplary illustration of a bus switching delay associated with acquiring the RFFE bus 208 (not shown) according to the RFFE handover procedure of FIG. 2A. Common elements between FIGS. 2A and 2B are shown therein with common element numbers and thus, will not be re-described herein.

With reference to FIG. 2B, at time $T_0$, the first master device 202 has ownership of the RFFE bus 208 for communicating the WWAN communication signal 216 via the slave device 206(1). At time $T_1$, the communication controller 212 instructs the second master device 204 via the configuration signal 220 to acquire the RFFE bus 208 for communicating the WLAN communication signal 218. In a first non-limiting example, it may take up to three hundred nanoseconds (300 ns) for the second master device 204 to receive and respond to the configuration signal 220. In response to receiving the configuration signal 220, at time $T_2$, the second master device 204 initiates the RFFE handover procedure by exchanging the bus handover signal 222 with the first master device 202. In a second non-limiting example, it may take up to seven hundred nanoseconds (700 ns) for the second master device 204 to acquire ownership of the RFFE, bus 208. After acquiring the RFFE bus 208, at time $T_3$, the second master device 204 reconfigures the slave device 206(1) via the slave configuration signal 224. In a third non-limiting example, it may require up to 300 ns for the second master device 204 to reconfigure the slave device 206(1). Subsequently, at time $T_4$, the second master device 204 starts communicating the WLAN communication signal 218 to the slave device 206(1) via the RFFE bus 208.

With continuing reference to FIG. 2B, the second master device 204 experiences approximately one thousand three hundred nanoseconds (~1300 ns) of bus switching delay (from time $T_1$ to time $T_4$) before the second master device 204 can start communicating the WLAN communication signal 218. The bus switching delay experienced by the second master device 204 may prove unacceptable in some time-critical application scenarios (e.g., gain setting, antenna switching, etc.) that demand the bus switching delay be under one microsecond (1 μs or 1000 ns). Failing to complete bus switching from the first master device 202 to the second master device 204 in under 1 μs may result in compromised operation (e.g., being late to switch an antenna tuner setting) in the conventional RFFE system 200 of FIG. 2A. In this regard, it may not be possible for the second master device 204 to acquire the RFFE bus 208 via normal RFFE, handover procedure. For example, the second master device 204 may preempt the WWAN communication signal 216 communicated by the first master device 202 to gain immediate access to the RFFE bus 208. However, abrupt preemption of the WWAN communication signal 216 may lead to undefined and unpredictable state changes in the first master device 202 and/or the slave device 206(1). As such, it may be desirable to reduce the bus switching delay experienced by the second master device 204 without interfering with the first master device 202.

In this regard, FIG. 3A is a schematic diagram of an exemplary RFFE system 300 in which at least one slave device such as slave device 302 is configured to be switched gracefully from communicating with at least one first master device such as first master device 304 to communicating with at least one second master device such as second master device 306 without suffering the bus switching delay illustrated in FIG. 2B. The RFFE system 300 may be configured to be backward compatible with the conventional RFFE system 200 of FIG. 2A. As such, common elements between FIGS. 2A and 3A are shown therein with common element numbers and thus, will not be re-described herein. In a non-limiting example, the first master device 304 and the second master device 306 may be collectively referred to as RFFE masters, and the slave device 302 may be referred to as an RFFE slave. In another non-limiting example, switching the slave device 302 gracefully from communicating with the first master device 304 to communicating with the second master device 306 means the slave device 302 can begin communicating with the second master device 306 without preempting ongoing communication with the first master device 304.

With reference to FIG. 3A, the slave device 302 is communicatively coupled to the first master device 304 and the second master device 306 by a first communication bus 308. In a non-limiting example, the first communication bus 308 is functionally equivalent to the RFFE bus 208 of FIG. 2A. In addition to the first communication bus 308, a second communication bus 310 is provided in the RFFE system 300 to provide a second communication path between the slave device 302, the first master device 304, and the second master device 306. In a non-limiting example, the second communication bus 310 may be configured to be a priority-access communication bus over the first communication bus 308. As is further discussed below, by adding the second communication bus 310 to the RFFE system 300, it is possible for the second master device 306 to gain prioritized access to the slave device 302 without abruptly preempting the ongoing communications between the slave device 302 and the first master device 304 over the first communication bus 308.

The first master device 304 is configured to communicate a first communication signal 312 with the slave device 302 over the first communication bus 308. In a non-limiting example, the first communication bus 308 may be configured to be functionally equivalent to the RFFE bus 208 of FIG. 2A. Accordingly, the first communication signal 312 may be communicated between the first master device 304 and the slave device 302 based on a first communication protocol, which is the MIPI RFFE protocol.

With continuing reference to FIG. 3A, when the second master device 306 is configured, by the configuration signal 220 for example, to communicate a second communication signal 314 with the slave device 302, the second master device 306 first detects whether the first communication bus 308 is occupied by the first master device 304 for communicating the first communication signal 312. If the second master device 306 detects that the first master device 304 is communicating the first communication signal 312 over the first communication bus 308, the second master device 306 may be configured to communicate the second communication signal 314 with the slave device 302 over the second communication bus 310. The slave device 302, which receives concurrently the first communication signal 312 over the first communication bus 308 and the second communication signal 314 over the second communication bus 310, is configured to protect data received in the second communication signal 314 from being overwritten by data received in the first communication signal 312. In this regard, in a non-limiting example, the slave device 302 may block data received in the first communication signal 312 from being written to certain data storage blocks (not shown) that are also updated by the data received in the second communication signal 314. Furthermore, the slave device 302 is also configured to ensure that the first communication signal 312 is not abruptly preempted by the second communication signal 314 causing unpredictable state changes at the first master device 304. Further discussion regarding functions of the slave device 302 is provided later with reference to FIG. 4. Hence, by configuring the second communication bus 310 to function as the priority-access communication bus in the RFFE, system 300, it is possible to expedite access to the slave device 302 by the second master device 306 without negatively impacting the first master device 304, thus eliminating the bus switching delay associated with the conventional RFFE system 200 of FIG. 2A.

In a first non-limiting example, the second communication bus 310 may be configured to communicate the second communication signal 314 based on the RFFE protocol. In a second non-limiting example, the second communication bus 310 may also be configured to communicate the second communication signal 314 based on a second communication protocol that is different from the RFFE protocol, including, but not limited to, a proprietary protocol.

In one non-limiting example, the first communication bus 308 and the second communication bus 310 may be controlled by a clock signal 316 received from a shared clock 318. In this regard, the first communication signal 312 communicated over the first communication bus 308 is synchronous to the second communication signal 314 communicated over the second communication bus 310. Alternatively, in another non-limiting example, the first communication bus 308 and the second communication bus 310 may also be configured to be controlled by a first clock 320 and a second clock 322, respectively. Accordingly, the first communication signal 312 communicated on the first communication bus 308 may be synchronous or asynchronous to the second communication signal 314 communicated on the second communication bus 310.

With continuing reference to FIG. 3A, the first master device 304 may detect that the slave device 302 receives the second communication signal 314 concurrently over the second communication bus 310. In a non-limiting example, the first master device 304 may detect existence of the second communication signal 314 on the second communication bus 310 as a result of data in the first communication signal 312 being blocked by the slave device 302 from being written to certain data storage blocks (not shown). In another non-limiting example, the first master device 304 may also detect the existence of the second communication signal 314 on the second communication bus 310 by monitoring activities on the second communication bus 310 using techniques such as carrier sensing. In response to detecting the second communication signal 314 on the second communication bus 310, the first master device 304 may gradually suspend communicating the first communication signal 312 over the first communication bus 308. Accordingly, when the second master device 306 detects that the first master device 304 is no longer communicating the first communication signal 312 on the first communication bus 308, the second master device 306 may utilize both the first communication bus 308 and the second communication bus 310 to communicate the second communication signal 314 with increased bandwidth. Alternatively, the second master device 306 may also switch from the second communication bus 310 to the first communication bus 308 to communicate the second communication signal 314.

In a non-limiting example, it is also possible for the first master device 304 to keep track of the data in the first communication signal 312 that is blocked by the slave device 302 while continuing to communicate the first communication signal 312 over the first communication bus 308. In this regard, the first master device 304 may be configured to resend the data that has been blocked by the slave device 302.

As mentioned earlier, it is possible to communicate both the first communication signal 312 and the second communication signal 314 based on the RFFE protocol. In this regard, FIG. 3B is a signal flow diagram 315 providing an exemplary illustration of the first master device 304 and the second master device 306 of FIG. 3A configured to communicate the first communication signal 312 and the second communication signal 314 based on the RFFE protocol. Common elements between FIGS. 3A and 3B are shown therein with common element numbers and thus, will not be re-described herein.

According to the RFFE protocol, an RFFE command sequence (also known as a protocol message sequence) starts with one or more sequence start condition (SSC) bits 324 and concludes with one or more park cycle (PC) bits 326. One or more data bits 328 are communicated in the RFFE command sequence between the SSC bit(s) 324 and the PC bit(s) 326. The RFFE command sequence is synchronized to the clock signal 316 that includes a plurality of clock cycles 330. According to the RFFE, protocol, the SSC bit(s) 324 occupies two consecutive clock cycles of the plurality of clock cycles 330 in the clock signal 316. The data bit(s) 328 and the PC bit(s) 326 each occupy one clock cycle of the plurality of clock cycles 330 in the clock signal 316.

Accordingly, at time $T_0$, the first master device 304 begins communicating the first communication signal 312 on the first communication bus 308 (not shown). At time $T_1$, the communication controller 212 (not shown) begins configuring the second master device 306 to communicate the second communication signal 314 via the configuration signal 220. At time $T_2$, the second master device 306 begins configuring the slave device 302 for communication by sending one or more start-bit (SB) bits 332 over the second communication bus 310 (not shown). Subsequently at time $T_3$, the second master device 306 begins communicating the second communication signal 314 in the data bit(s) 328. In a non-limiting example, it is also possible for the second master device 306 to temporarily stop the second communication signal 314 with one or more stop (STP) bits 334 and then resume with another one of the SB bit(s) 332.

At time $T_X$, the first master device 304 stops the first communication signal 312 with the PC bit(s) 326. As such, the first communication bus 308 becomes idle when the first communication signal 312 is stopped. In this regard, the second master device 306 may take advantage of the additional bandwidth available on the first communication bus 308 by communicating the second communication signal 314 concurrently or simultaneously on both the first communication bus 308 and the second communication bus 310. As such, at time $T_Y$, the second master device 306 starts communicating the second communication signal 314 on the first communication bus 308 with the SSC bit(s) 324.

With continuing reference to FIG. 3B, since the SB bit(s) 332 occupies only one clock cycle of the plurality of clock cycles 330, as opposed to the SSC bit(s) 324 that occupies two consecutive clock cycles of the plurality of clock cycles 330, the second master device 306 can configure the slave device 302 with reduced delay. Furthermore, by utilizing the second communication bus 310 to switch the slave device 302 from communicating with the first master device 304 to communicating with the second master device 306, it is possible to eliminate or substantially reduce processing delays associated with the RFFE handover procedure employed by the conventional RFFE, system 200 of FIG. 2A. As such, it is possible to switch the slave device 302 from communicating with the first master device 304 to communicating with the second master device 306 with less than 1 µs switch delay, thus allowing the RFFE system 300 of FIG. 3A to support sufficiently time-critical application scenarios such as gain setting, antenna switching, etc.

Figure 3C:
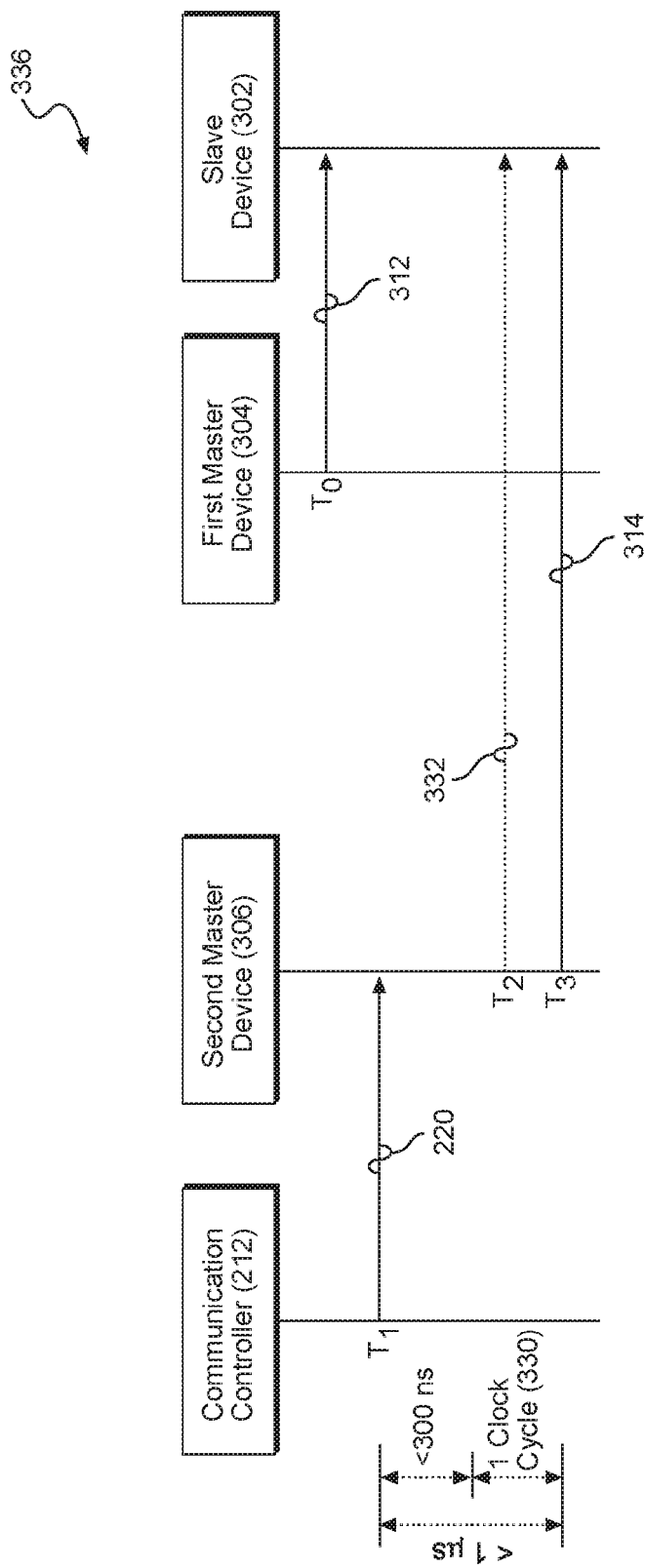
FIG. 3C is a signal flow diagram providing an exemplary illustration of processing delays associated with switching the at least one slave device of FIG. 3A from communicating with the at least one first master device to communicating with the at least one second master device using a second communication bus.

In this regard, FIG. 3C is a signal flow diagram 336 providing an exemplary illustration of processing delays associated with switching the slave device 302 of FIG. 3A from communicating with the first master device 304 to communicating with the second master device 306 using the second communication bus 310 (not shown). Common elements between FIGS. 3A, 3B, and 3C are shown therein with common element numbers and thus, will not be re-described herein.

With reference to FIG. 3C, at time $T_1$, the communication controller 212 instructs the second master device 306 to set up communication with the slave device 302. According to the previous discussion with reference to FIG. 2B, it may take up to 300 ns for the second master device 306 to receive and respond to the configuration signal 220. In a non-limiting example, it may be possible to shorten delays associated with the configuration signal 220 by using shorter packets. For example, if the clock signal 316 (not shown) has a clock frequency of seventy-six and eight tenths megahertz (76.8 MHz), the delays associated with the configuration signal 220 can be reduced to one hundred thirty and twenty-one hundredths nanoseconds (130.21 ns), one hundred four and seventeen hundredths nanoseconds (104.17 ns), and seventy-eight and thirteen hundredths nanoseconds (78.13 ns), respectively, by using ten-bit (10-b), eight-bit (8-b), and six-bit (6-b) packets in the configuration signal 220.

With continuing reference to FIG. 3C, at time $T_2$, the second master device 306 sends the SB bit(s) 332 to set up the RFFE command sequence for communicating the second communication signal 314 to the slave device 302. As discussed above in reference to FIG. 3B, it takes one clock cycle of the plurality of clock cycles 330 of the clock signal 316 to send the SB bit(s) 332 to the slave device 302. Subsequently at time $T_3$, the second master device 306 begins communicating the second communication signal 314 to the slave device 302. As such, by utilizing the second communication bus 310, it is possible to reduce substantially the processing delays associated with switching the slave device 302 from communicating with the first master device 304 to communicating with the second master device 306 within 1 μs.

Figure 4:
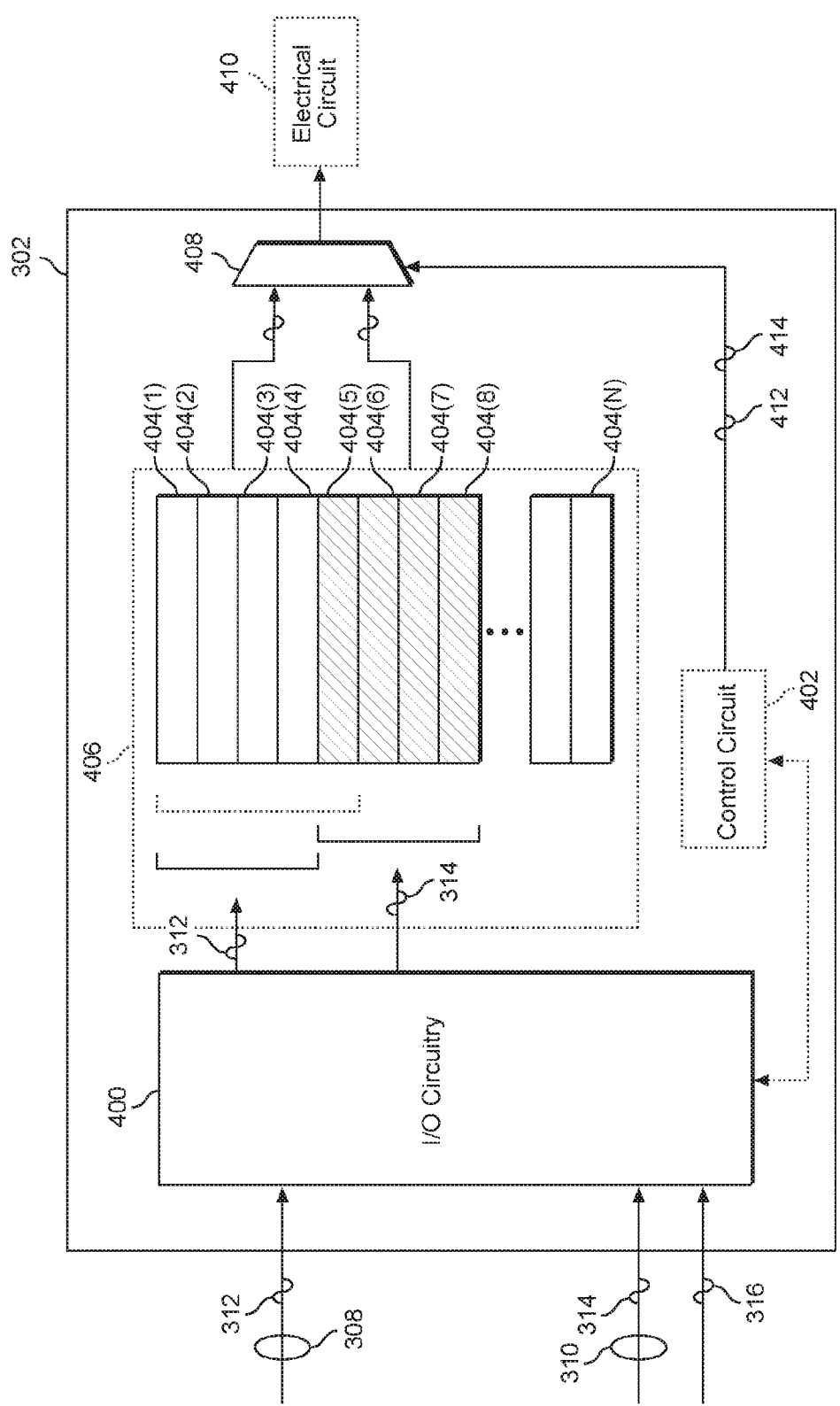
FIG. 4 is an exemplary schematic diagram of the at least one slave device of FIG. 3A configured to enable graceful switching from communicating with the at least one first master device to communicating with the at least one second master device with reduced processing delays.

As mentioned above with reference to FIG. 3A, the slave device 302 may block the data received in the first communication signal 312 from being written to certain data storage blocks that are also updated by the data received in the second communication signal 314. In this regard, FIG. 4 is an exemplary schematic diagram of the slave device 302 of FIG. 3A configured to enable graceful switching from communicating with the first master device 304 to communicating with the second master device 306 with reduced processing delays. Common elements between FIGS. 3A, 3B, and 4 are shown therein with common element numbers and thus, will not be re-described herein.

With reference to FIG. 4, the slave device 302 includes input/output (I/O) circuitry 400 communicatively coupled to the first communication bus 308 and the second communication bus 310. The slave device 302 also includes a control circuit 402 communicatively coupled to the I/O circuitry 400. In a non-limiting example, the control circuit 402 may be provided as part of the I/O circuitry 400. The slave device 302 also includes a plurality of data storage blocks 404(1)-404(N). In a non-limiting example, each of the plurality of data storage blocks 404(1)-404(N) may be a control register. Collectively, the plurality of data storage blocks 404(1)-404(N) may form a register bank 406. For the convenience of reference and illustration, data storage blocks 404(1)-404(8) are discussed hereinafter as non-limiting examples. It shall be appreciated that any configuration and operation principles discussed with reference to the data storage blocks 404(1)-404(8) are applicable to any of the plurality of data storage blocks 404(1)-404(N) in the slave device 302.

The slave device 302 also includes an I/O control logic 408 configured to control a coupled electrical circuit 410. In a non-limiting example, the coupled electrical circuit 410 may be an RF FEM such as the antenna tuner 152, the switch 154, and the power amplifier 156 of FIG. 1.

In a non-limiting example, at time $T_0$ (not shown), the slave device 302 receives only the first communication signal 312 on the first communication bus 308. The data received in the first communication signal 312 is written to the data storage blocks 404(1)-404(5) (first data storage blocks). Accordingly, the control circuit 402 may provide a first control signal 412 to the I/O control logic 408. The first control signal 412 configures the I/O control logic 408 to control the coupled electrical circuit 410 based on the data received from the first communication signal 312 and stored in the data storage blocks 404(1)-404(5).

At time $T_3$ (not shown), the slave device 302 starts receiving the second communication signal 314 on the second communication bus 310, and the data received in the second communication signal 314 is intended to be written into the data storage blocks 404(5)-404(8) (second data storage blocks), for example. In this regard, there is a conflict as both the first communication signal 312 and the second communication signal 314 are attempting to write data into the data storage block 404(5). As such, as soon as the control circuit 402 detects the second communication signal 314 on the second communication bus 310, the control circuit 402 begins to protect the data storage blocks 404(5)-404(8) from being overwritten by the first communication signal 312. Accordingly, the control circuit 402 may provide a second control signal 414 to the I/O control logic 408. The second control signal 414 reconfigures the I/O control logic 408 to control the coupled electrical circuit 410 based on the data received from the second communication signal 314 and stored in the data storage blocks 404(5)-404(8).

With continuing reference to FIG. 4, when the slave device 302 protects the data storage blocks 404(5)-404(8) from being overwritten by the first communication signal 312, the data storage block 404(5) becomes inaccessible to the first master device 304 (not shown). According to the previous discussion with reference to FIG. 3A, the first master device 304 may continue writing data to the data storage blocks 404(1)-404(4) while keeping track of data in the first communication signal 312 that is blocked out of the data storage block 404(5). The first master device 304 may resume writing data to the data storage block 404(5) when the slave device 302 removes write protection on the data storage block 404(5).

Figure 5:
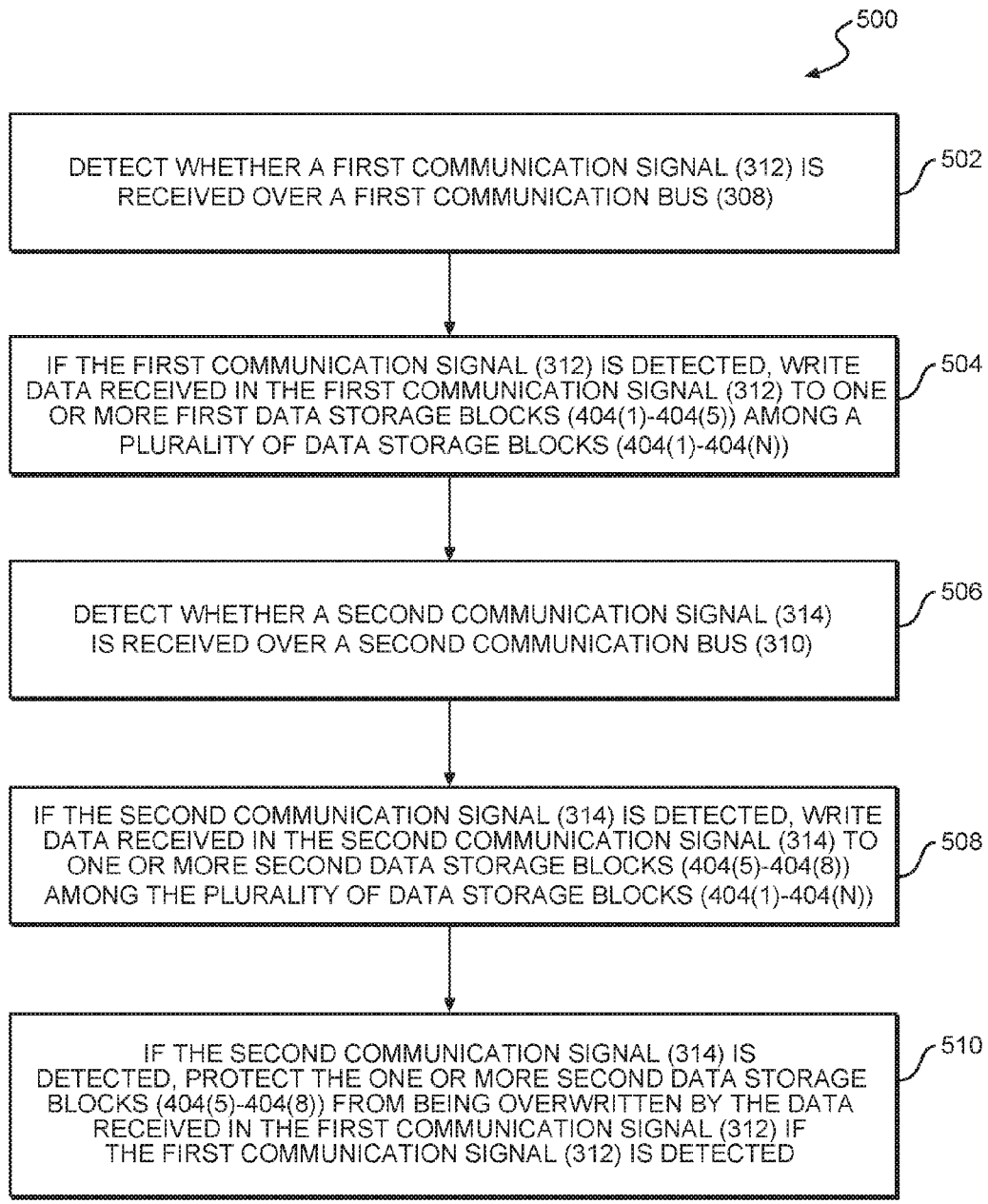
FIG. 5 is a flowchart of an exemplary control process that is employed by the at least one slave device of FIG. 4 for controlling communications over a first communication bus and a second communication bus in the RFFE system of FIG. 3A.

FIG. 5 is a flowchart of an exemplary control process 500 that is employed by the slave device 302 of FIG. 4 for controlling communications over the first communication bus 308 and the second communication bus 310 in the RFFE system 300 of FIG. 3A. According to the control process 500, the control circuit 402 detects whether the first communication signal 312 is received over the first communication bus 308 (block 502). If the first communication signal 312 is detected, the control circuit 402 configures the I/O circuitry 400 to write the data received in the first communication signal 312 to one or more of the first data storage blocks 404(1)-404(5) among the plurality of data storage blocks 404(1)-404(N) (block 504).

With continuing reference to FIG. 5, the control circuit 402 then detects whether the second communication signal 314 is received over the second communication bus 310 (block 506). If the second communication signal 314 is detected, the control circuit 402 configures the I/O circuitry 400 to write the data received in the second communication signal 314 to one or more of the second data storage blocks 404(5)-404(8) among the plurality of data storage blocks 404(1)-404(N) (block 508). Furthermore, if the first communication signal 312 is also detected, the control circuit 402 also protects the one or more of the second data storage blocks 404(5)-404(8) from being overwritten by the data received in the first communication signal 312 (block 510). In a non-limiting example, if the control circuit 402 does not detect the first communication signal 312 on the first communication bus 308 while detecting the second communication signal 314 on the second communication bus 310, the control circuit 402 may decide not to protect the one or more of the second data storage blocks 404(5)-404(8).

Figure 6:
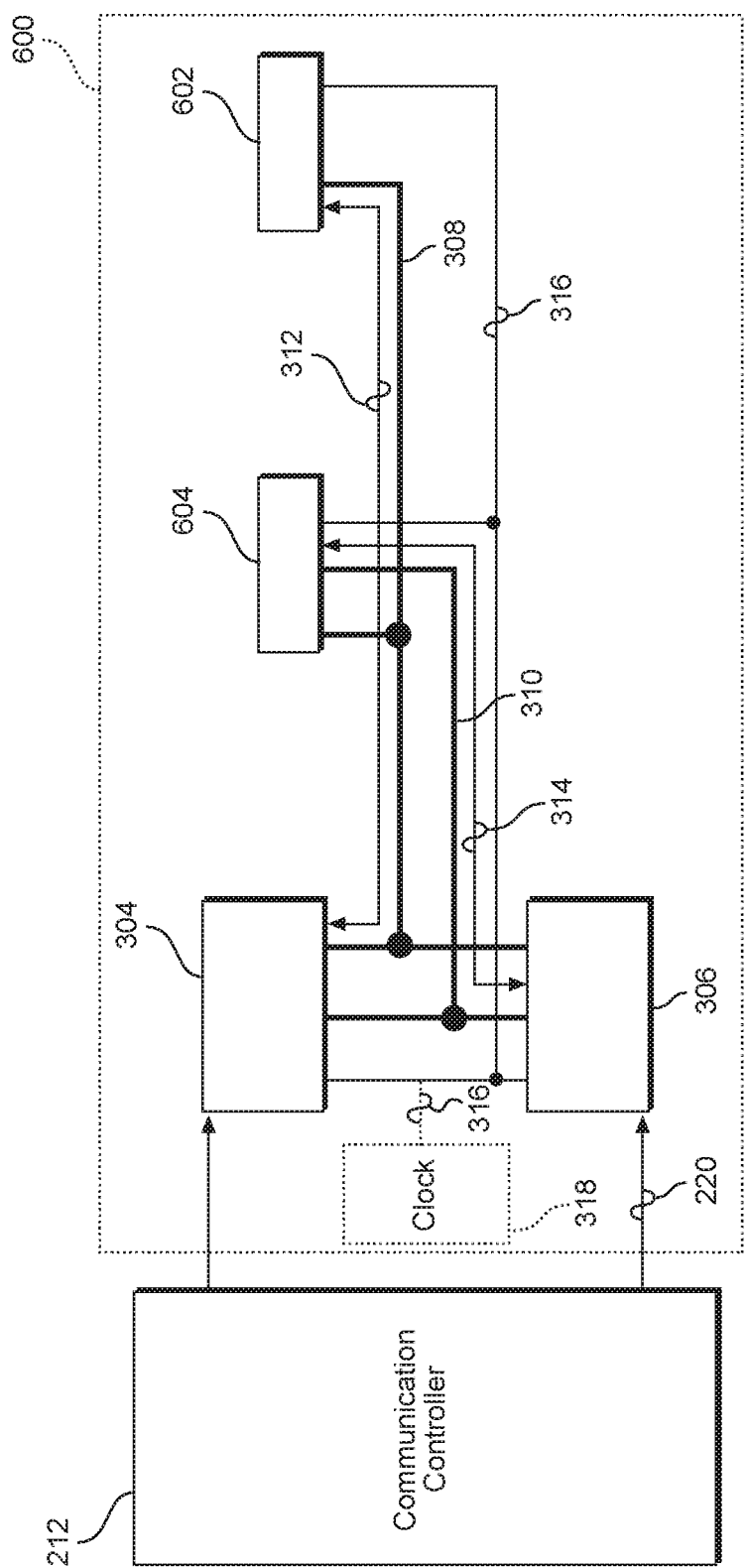
FIG. 6 is a schematic diagram of an exemplary RFFE system that includes at least one first slave device supporting only a first communication bus and at least one second slave device supporting a second communication bus in addition to the first communication bus.

In addition to supporting the slave device 302 according to aspects discussed and illustrated above, the RFFE system 300 of FIG. 3A may be adapted to support concurrently a conventional RFFE slave device. In this regard, FIG. 6 is a schematic diagram of an exemplary RFFE system 600 that includes at least one first slave device such as first slave device 602 supporting only the first communication bus 308 of FIG. 3A and at least one second slave device such as second slave device 604 supporting both the first communication bus 308 and the second communication bus 310. Common elements between FIGS. 3A and 6 are shown therein with common element numbers and thus, will not be re-described herein.

With reference to FIG. 6, the second slave device 604 in the RFFE system 600 is functionally equivalent to the slave device 302 in the RFFE system 300. As such, functional aspects of the slave device 302 discussed with reference to FIGS. 3A-5 are applicable to the second slave device 604 as well. In a non-limiting example, the first slave device 602 is a legacy RFFE slave device capable of supporting only the first communication bus 308, and the second slave device 604 is an enhanced RFFE slave device capable of supporting both the first communication bus 308 and the second communication bus 310.

With continuing reference to FIG. 6, the first master device 304 communicates the first communication signal 312 with the first slave device 602 over the first communication bus 308. The second master device 306 can set up and communicate the second communication signal 314 with the second slave device 604 over the second communication bus 310. In this regard, according to the previous discussion with reference to FIG. 3C, the second master device 306 can set up communications with the second slave device 604 with less than 1 μs delay, thus allowing the second communication signal 314 to be communicated over the second communication bus 310 in a timely manner without interrupting the first communication signal 312 on the first communication bus 308. In this regard, it is possible for the legacy RFFE slave device and the enhanced RFFE slave device to coexist in the RFFE system 600 for backward compatibility.

Figure 7:
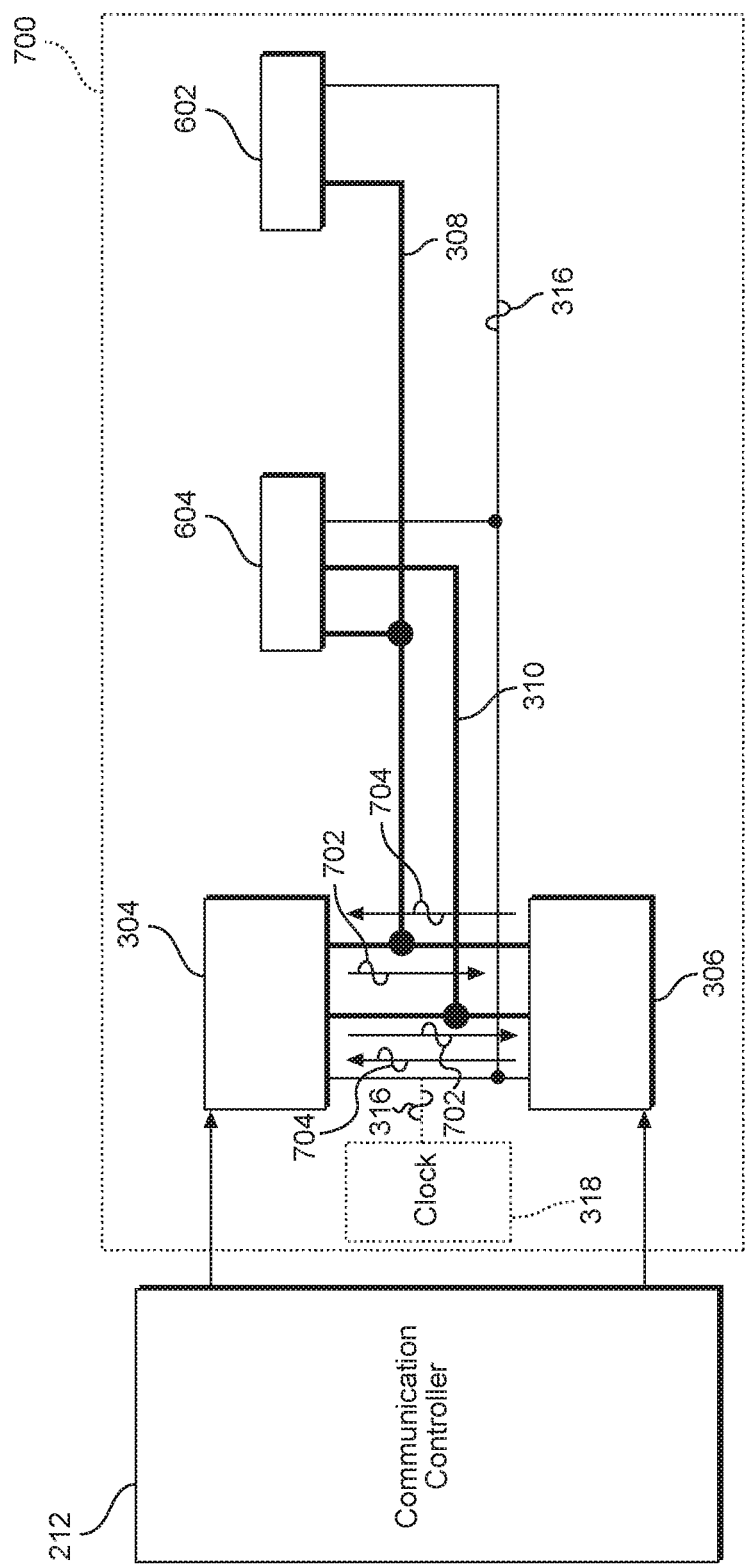
FIG. 7 is a schematic diagram of an exemplary RFFE system in which the at least one first master device and the at least one second master device of FIG. 3A are configured to communicate with each other over a first communication bus and a second communication bus.

In addition to communicating with the first slave device 602 and the second slave device 604, the first master device 304 and the second master device 306 may also communicate with each other using the first communication bus 308 and the second communication bus 310. In this regard, FIG. 7 is a schematic diagram of an exemplary RFFE system 700 in which the first master device 304 and the second master device 306 of FIG. 3A are configured to communicate with each other over the first communication bus 308 and the second communication bus 310. Common elements between FIGS. 3A, 6, and 7 are shown therein with common element numbers and thus, will not be re-described herein.

With reference to FIG. 7, in a first non-limiting example, the first master device 304 may be configured to transmit data 702 to the second master device 306 over the first communication bus 308 and receive data 704 from the second master device 306 over the second communication bus 310. In another non-limiting example, the first master device 304 may transmit the data 702 to the second master device 306 over the second communication bus 310 and receive the data 704 from the second master device 306 over the first communication bus 308. In this regard, the first communication bus 308 and the second communication bus 310 can support half-duplex communications between the first master device 304 and the second master device 306. Furthermore, in another non-limiting example, the first master device 304 may utilize both the first communication bus 308 and the second communication bus 310 to enable full-duplex communications with the second master device 306. Likewise, the second master device 306 may also utilize both the first communication bus 308 and the second communication bus 310 to enable full-duplex communications with the first master device 304.

The priority-based data communication over multiple communication buses according to aspects disclosed herein may be provided in or integrated into any processor-based device having a communication bus that has latency concerns. Examples, without limitation, include a set top box, an entertainment unit, a navigation device, a communications device, a fixed location data unit, a mobile location data unit, a mobile phone, a cellular phone, a smart phone, a tablet, a phablet, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile. While all such devices may benefit from the present disclosure, devices relying on a wireless connection and having an RFFE bus will see the greatest benefit from using aspects of the present disclosure.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An electronic device, comprising:
   a plurality of data storage blocks;
   input/output (I/O) circuitry communicatively coupled to a first communication bus and a second communication bus; and
   a control circuit configured to:
      detect whether the I/O circuitry receives a first communication signal over the first communication bus;
      if the first communication signal is detected, configure the I/O circuitry to write data received in the first communication signal to one or more first data storage blocks among the plurality of data storage blocks;
      detect whether the I/O circuitry receives a second communication signal over the second communication bus; and
      if the second communication signal is detected:
         configure the I/O circuitry to write data received in the second communication signal to one or more second data storage blocks among the plurality of data storage blocks, wherein at least one first data storage block among the one or more first data storage blocks overlaps with at least one second data storage block among the one or more second data storage blocks; and
         protect at least one second data storage block from being overwritten by the data received in the first communication signal if the first communication signal is detected.

2. The electronic device of claim 1, wherein the control circuit is further configured to
   allow the data received in the first communication signal to be written to a remainder of the one or more first data storage blocks that are non-overlapping with the one or more second data storage blocks.

3. The electronic device of claim 1, further comprising:
   an I/O control logic configured to control a coupled electrical circuit;
   wherein the control circuit is further configured to:
      configure the I/O control logic to control the coupled electrical circuit based on the second communication signal if the second communication signal is detected; and
      configure the I/O control logic to control the coupled electrical circuit based on the first communication signal if the first communication signal is detected and the second communication signal is not detected.

4. The electronic device of claim 3, wherein the I/O control logic is configured to control a coupled radio frequency (RF) front-end module (FEM) (RF FEM).

5. The electronic device of claim 1, wherein the I/O circuitry is configured to:
   receive the first communication signal based on a first communication protocol; and
   receive the second communication signal based on a second communication protocol.

6. The electronic device of claim 5, wherein the I/O circuitry is configured to receive the first communication signal based on the MIPI Alliance® radio frequency front-end control interface (RFFE) protocol.

7. The electronic device of claim 1, wherein the I/O circuitry is configured to receive the first communication signal and the second communication signal synchronously.

8. The electronic device of claim 1, wherein the I/O circuitry is configured to receive the first communication signal and the second communication signal asynchronously.

9. The electronic device of claim 1, wherein the I/O circuitry is configured to receive the first communication signal originating from a first master device and receive the second communication signal originating from a second master device.

10. The electronic device of claim 1 provided in a device selected from the group consisting of: a set top box; an entertainment unit; a navigation device; a communications device; a fixed location data unit; a mobile location data unit; a mobile phone; a cellular phone; a smart phone; a tablet; a phablet; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; and an automobile.

11. A method for controlling communications over a first communication bus and a second communication bus, comprising:
    detecting whether a first communication signal is received over a first communication bus;
    if the first communication signal is detected, writing data received in the first communication signal to one or more first data storage blocks among a plurality of data storage blocks;
    detecting whether a second communication signal is received over a second communication bus; and
    if the second communication signal is detected:
        writing data received in the second communication signal to one or more second data storage blocks among the plurality of data storage blocks, wherein at least one first data storage block among the one or more first data storage blocks overlaps with at least one second data storage block among the one or more second data storage blocks; and
        protecting the at least one second data storage block from being overwritten by the data received in the first communication signal if the first communication signal is detected.

12. The method of claim 11, further comprising:
    determining if there exists the at least one first data storage block among the one or more first data storage blocks that overlaps with the at least one second data storage block among the one or more second data storage blocks; and
    allowing the data received in the first communication signal to be written to a remainder of the one or more first data storage blocks that are non-overlapping with the one or more second data storage blocks.

13. The method of claim 11, further comprising:
    receiving the first communication signal based on a first communication protocol; and
    receiving the second communication signal based on a second communication protocol.

14. A communication system, comprising:
    at least one first master device configured to communicate a first communication signal with at least one slave device over a first communication bus;
    at least one second master device configured to:
        detect whether the at least one first master device communicates the first communication signal over the first communication bus; and
        communicate a second communication signal with the at least one slave device over a second communication bus if the at least one first master device is detected to communicate the first communication signal over the first communication bus; and
    the at least one slave device, comprising:
        a plurality of data storage blocks;
        input/output (I/O) circuitry communicatively coupled to the first communication bus and the second communication bus; and
        a control circuit configured to:
            detect whether the I/O circuitry receives the first communication signal over the first communication bus;
            if the first communication signal is detected, configure the I/O circuitry to write data received in the first communication signal to one or more first data storage blocks among the plurality of data storage blocks;
            detect whether the I/O circuitry receives the second communication signal over the second communication bus; and
            if the second communication signal is detected:
                configure the I/O circuitry to write data received in the second communication signal to one or more second data storage blocks among the plurality of data storage blocks, wherein at least one first data storage block among the one or more first data storage blocks overlaps with at least one second data storage block among the one or more second data storage blocks; and
                protect the at least one second data storage block from being overwritten by the data received in the first communication signal if the first communication signal is detected.

15. The communication system of claim 14, wherein the control circuit is further configured to
    allow the data received in the first communication signal to be written to a remainder of the one or more first data storage blocks that are non-overlapping with the one or more second data storage blocks.

16. The communication system of claim 15, wherein the at least one first master device is further configured to:
    detect the second communication signal communicated by the at least one second master device on the second communication bus; and
    keep track of data in the first communication signal that is blocked by the control circuit from being written to the at least one first data storage block overlapping with the at least one second data storage block.

17. The communication system of claim 16, wherein the at least one first master device is further configured to resend the data in the first communication signal that is blocked by the control circuit from being written to the at least one first data storage block overlapping with the at least one second data storage block.

18. The communication system of claim 14, wherein the at least one second master device is further configured to communicate the second communication signal with the at least one slave device over the first communication bus and the second communication bus if the at least one second master device does not detect the first communication signal on the first communication bus.

19. The communication system of claim 14, wherein the at least one second master device is further configured to switch from the second communication bus to the first communication bus to communicate the second communication signal with the at least one slave device over the first communication bus and the second communication bus if the at least one second master device does not detect the first communication signal on the first communication bus.

20. The communication system of claim 14, further comprising a shared clock configured to control the first communication bus and the second communication bus.

21. The communication system of claim 14, further comprising a first clock configured to control the first communication bus and a second clock configured to control the second communication bus.

22. The communication system of claim 14, wherein the at least one slave device further comprises:
   an I/O control logic configured to control a coupled electrical circuit; and
   the control circuit is further configured to:
      configure the I/O control logic to control the coupled electrical circuit based on the second communication signal if the second communication signal is detected; and
      configure the I/O control logic to control the coupled electrical circuit based on the first communication signal if the first communication signal is detected and the second communication signal is not detected.

23. The communication system of claim 22, wherein the I/O control logic is configured to control a coupled radio frequency (RF) front-end module (FEM) (RF FEM).

24. The communication system of claim 14, wherein the I/O circuitry is configured to:
   receive the first communication signal based on a first communication protocol; and
   receive the second communication signal based on a second communication protocol.

25. The communication system of claim 24, wherein the I/O circuitry is further configured to:
   receive the first communication signal based on the MIPI Alliance® radio frequency front-end control interface (RFFE) protocol; and
   receive the second communication signal based on the RFFE protocol.

26. The communication system of claim 24, wherein the first communication protocol is different from the second communication protocol.

27. The communication system of claim 14, further comprising at least one second slave device configured to receive the first communication signal over the first communication bus.

28. A communication system, comprising:
   at least one first master device configured to communicate a first communication signal with at least one first slave device over a first communication bus;
   at least one second master device configured to communicate a second communication signal with at least one second slave device over a second communication bus; and
   the at least one second slave device, comprising:
      a plurality of data storage blocks;
      input/output (I/O) circuitry communicatively coupled to the first communication bus and the second communication bus; and
      a control circuit configured to:
         detect whether the I/O circuitry receives the second communication signal over the second communication bus; and
         if the second communication signal is detected:
            configure the I/O circuitry to write data received in the second communication signal to one or more second data storage blocks among the plurality of data storage blocks, wherein at least one first data storage block among one or more first data storage blocks overlaps with at least one second data storage block among the one or more second data storage blocks; and
            protect the at least one second data storage block from being overwritten by data received in the first communication signal if the first communication signal is also detected on the second communication bus.

29. The communication system of claim 28, wherein the at least one second master device is further configured to transmit data to the at least one first master device over the first communication bus and receive data from the at least one first master device over the second communication bus.

30. The communication system of claim 28, wherein the at least one second master device is further configured to transmit data to the at least one first master device over the second communication bus and receive data from the at least one first master device over the first communication bus.

* * * * *